June 6, 1967 L. A. ERICKSON ET AL 3,323,780
YARDER
Filed July 7, 1966 6 Sheets-Sheet 1

INVENTORS
LOUIS A. ERICKSON
ELMER R. HOGAN
BY
*Seed & Berry*
ATTORNEYS

June 6, 1967  L. A. ERICKSON ET AL  3,323,780
YARDER
Filed July 7, 1966  6 Sheets-Sheet 2
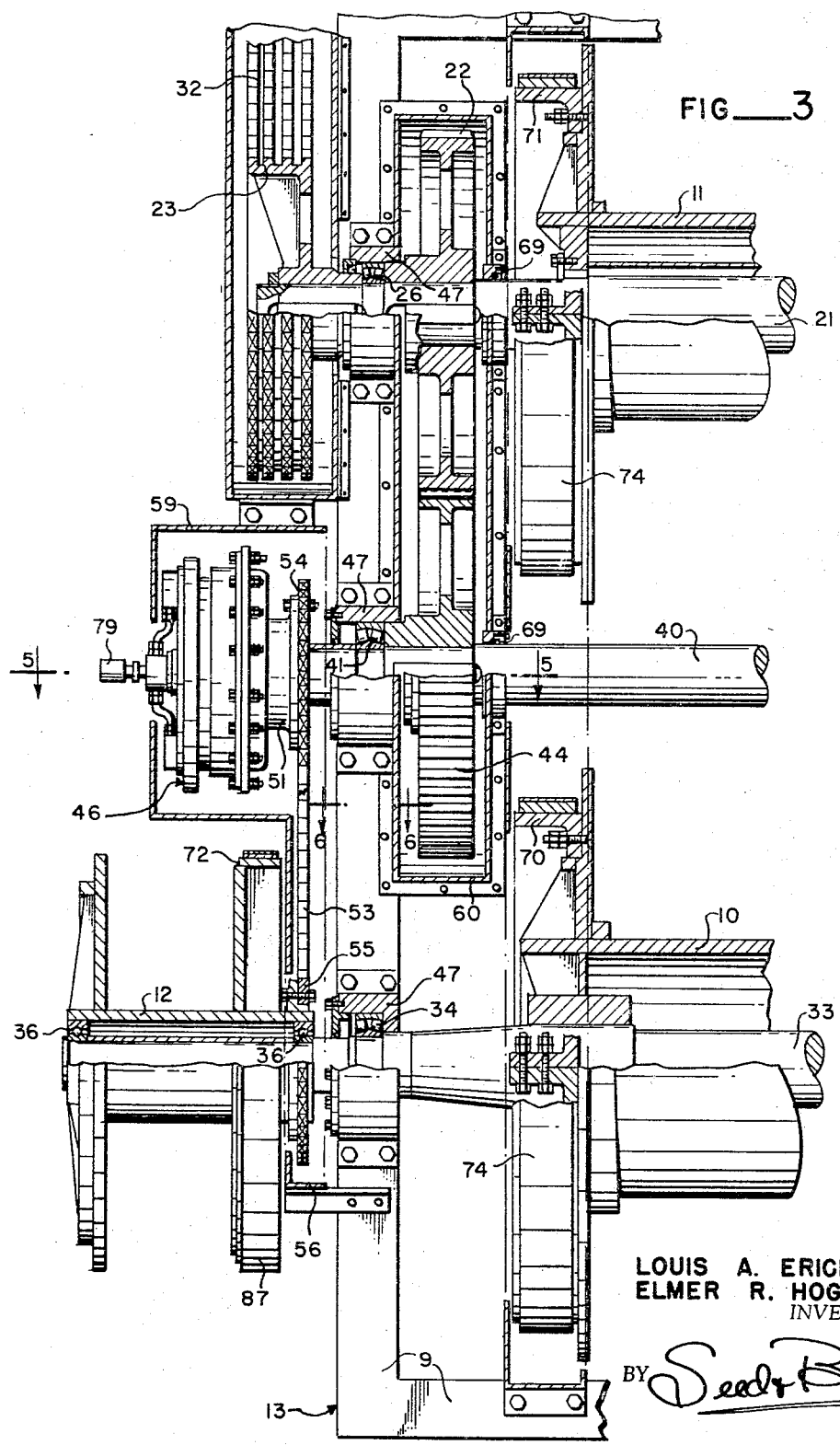
FIG__3
LOUIS A. ERICKSON
ELMER R. HOGAN
INVENTORS
BY Sealy Berry
ATTORNEYS

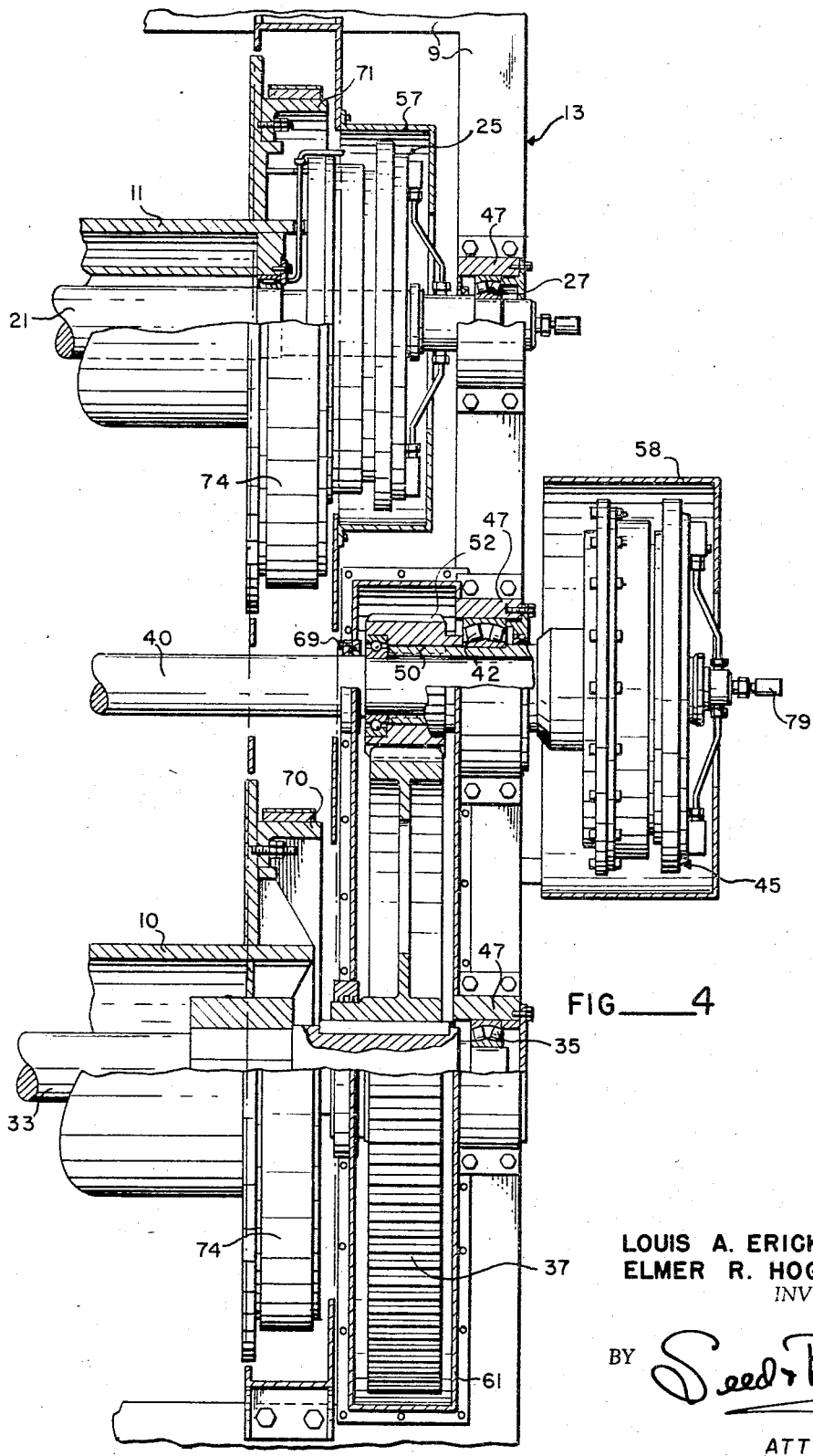

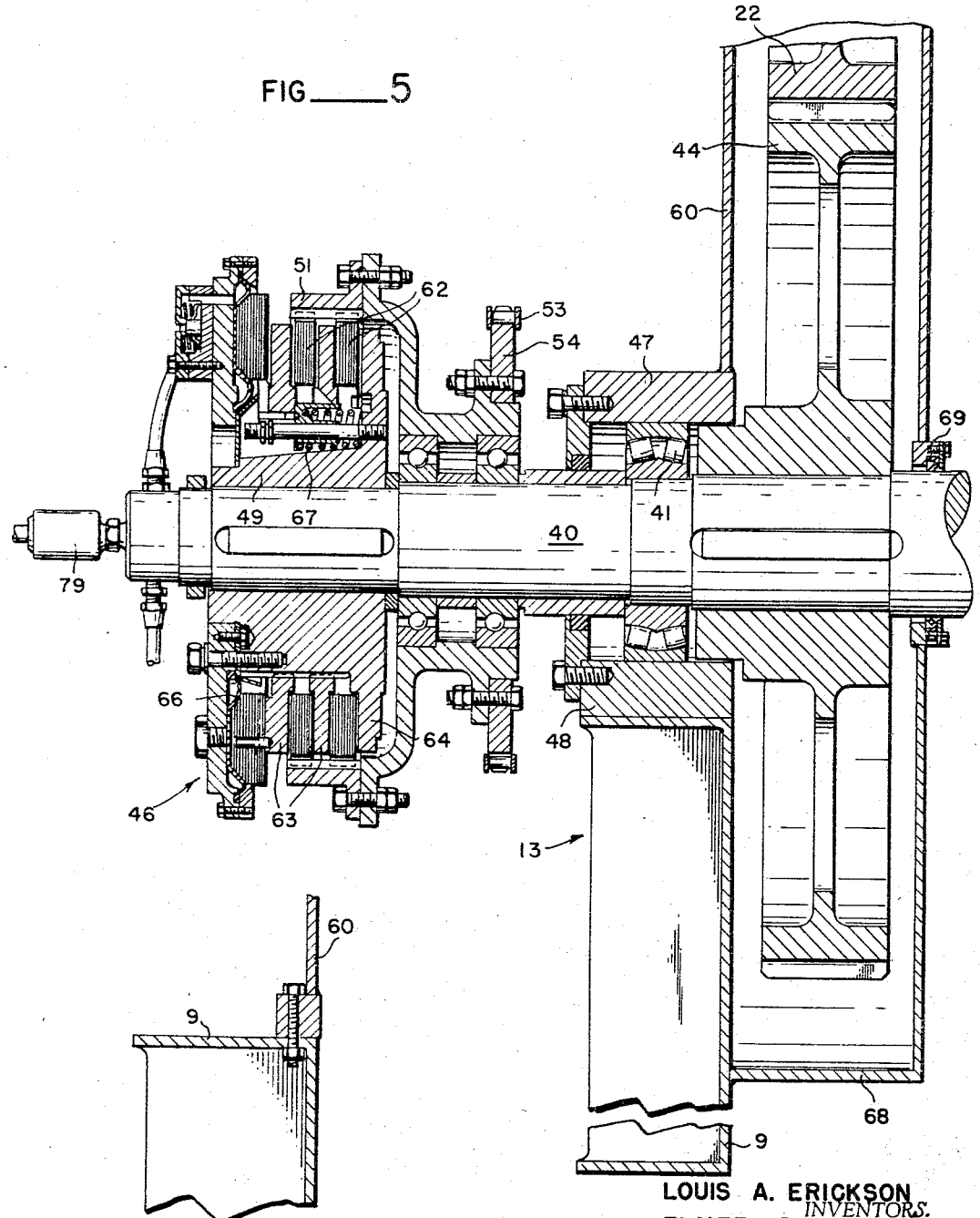

June 6, 1967  L. A. ERICKSON ET AL  3,323,780

YARDER

Filed July 7, 1966  6 Sheets-Sheet 5

LOUIS A. ERICKSON
ELMER R. HOGAN
*INVENTOR.*

BY *Seed Berry*

ATTORNEYS

June 6, 1967    L. A. ERICKSON ET AL    3,323,780
YARDER
Filed July 7, 1966    6 Sheets-Sheet 6
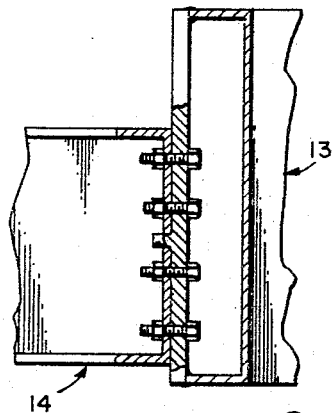
FIG___9
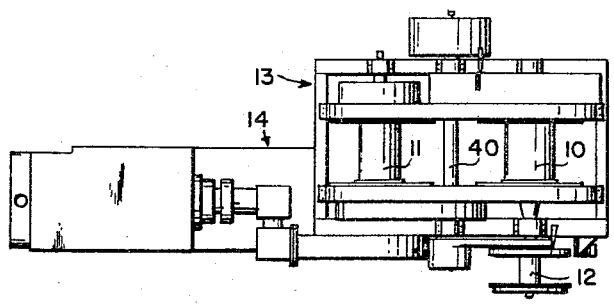
FIG___10
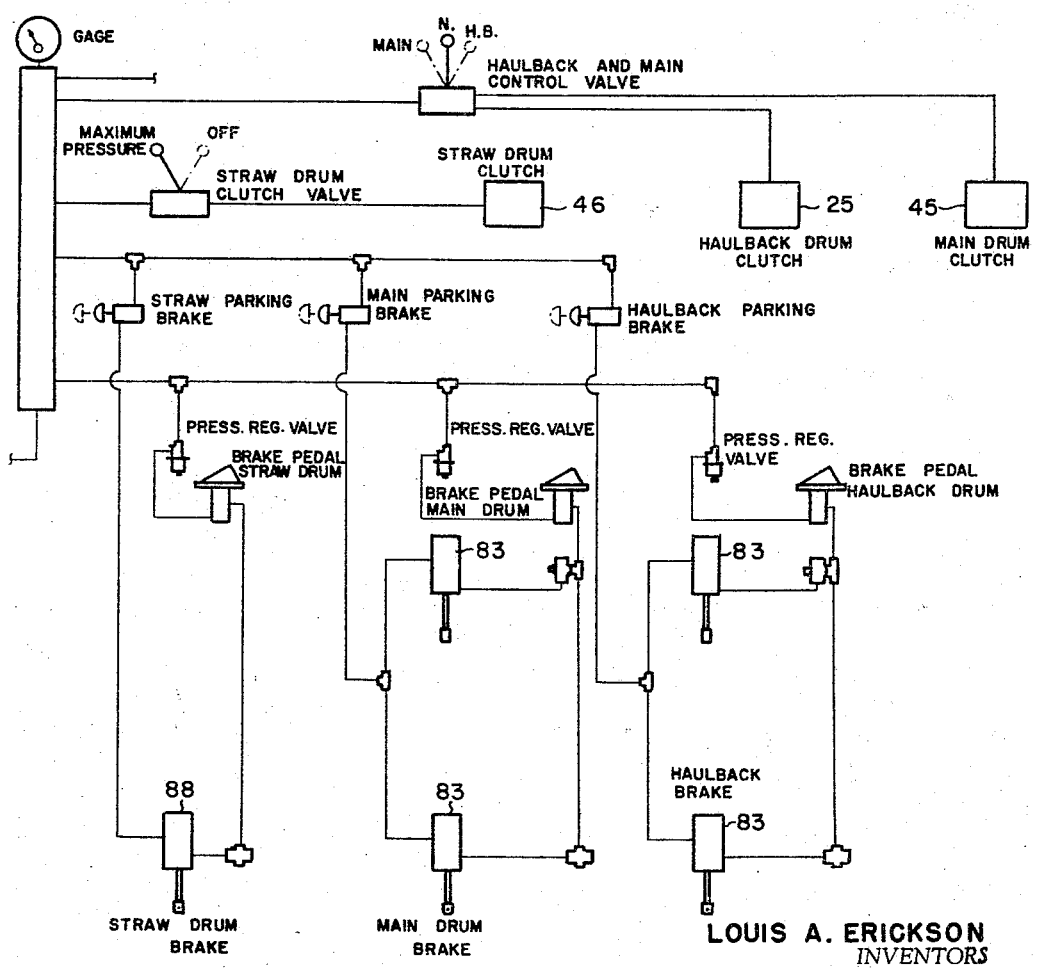
LOUIS A. ERICKSON
ELMER R. HOGAN
INVENTORS
BY Seed & Berry
ATTORNEYS United States Patent Office 3,323,780
Patented June 6, 1967

3,323,780
YARDER
Louis A. Erickson, Seattle, and Elmer R. Hogan, Bellevue, Wash., assignors to Smith-Berger Manufacturing Corporation, Seattle, Wash., a corporation of Washington
Filed July 7, 1966, Ser. No. 563,499
23 Claims. (Cl. 254—185)

ABSTRACT OF THE DISCLOSURE

A yarder having two paralleling drum-carrying shafts with a transfer shaft between the same, with either the transfer shaft or one of the drum shafts direct-driven from an engine, and having means including separate clutches at least one of which is carried on the transfer shaft for passing drive to the drums.

This application is a continuation-in-part of our co-pending patent application Ser. No. 322,750, filed Nov. 12, 1963.

This invention relates to a yarder, and for its principal objects aims to provide a yarder which admits to inexpensive fabrication, and which is ruggedly constructed so as to give long and trouble-free operation but which can be serviced easily and inexpensively should a need therefore arise.

A particular object ancillary to the above in point of assuring long and trouble-free operation is to employ sets of meshing transfer gears to pass power between shafts, and engineering the yarder so that these gears are housed in liquid-tight casings to permit the same to run in oil.

Another and important object is to provide a yarder in which parts are made interchangeable to the maximum degree possible in order that inventory requirements for servicing needs can be held to a minimum.

A yet additional object is to provide a yarder having its spooling drums and the power plant therefor mounted on separate platforms detachable one from the other.

These and other objects and advantages of the invention will appear and be understood in the course of the following description and in the claims annexed thereto, the invention consisting in the novel construction and in the adaptation and combination of parts hereinafter described and claimed.

In the accompanying drawings:

FIGS. 3 and 4 are horizontal sectional views drawn to an enlarged scale on the section line 3 & 4—3 & 4 of FIG. 2 and, taken together, illustrate the drum assembly for the yarder and the mounting bed therefor.

FIG. 5 is a fragmentary transverse vertical sectional view drawn to a yet larger scale on line 5—5 of FIG. 3.

FIG. 6 is a fragmentary transverse vertical sectional view on line 6—6 of FIG. 3 employing the same scale as that of FIG. 4.

FIG. 9 is a detail longitudinal vertical sectional view drawn to an enlarged scale on line 9—9 of FIG. 1.

FIG. 10 is a small-scale schematic plan view showing an alternative placement of the power plant relative to the drums; and FIG. 11 is a diagram of the several clutches and brakes providing for the spooling drums, and the controls therefor.

Figure 1:
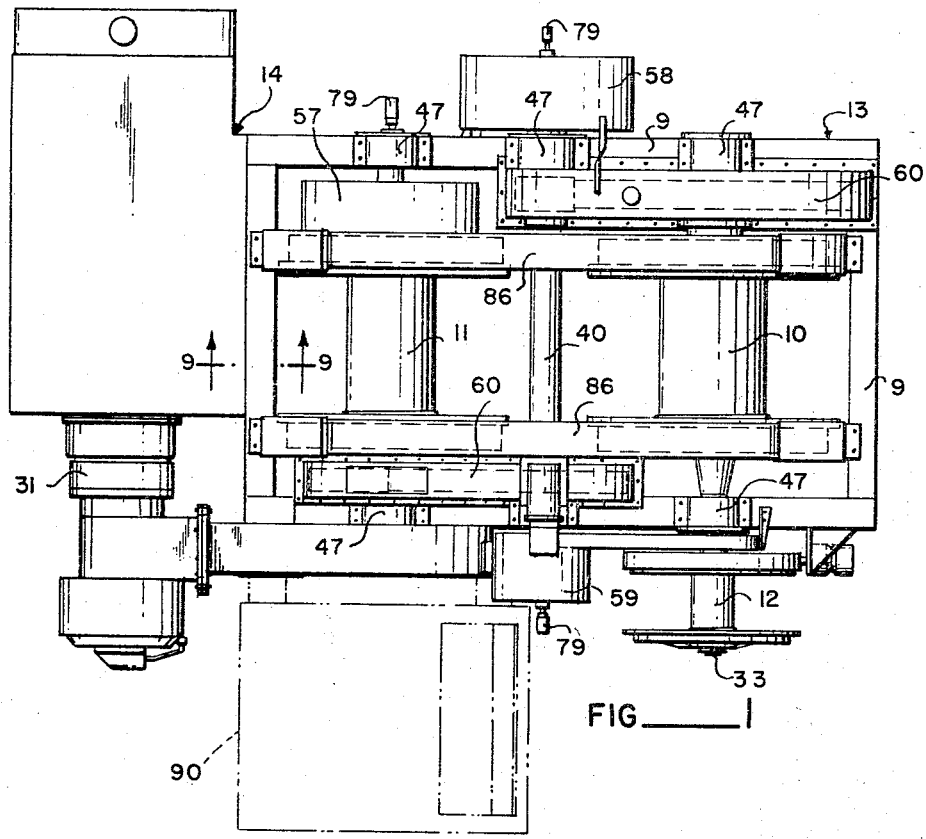
FIGURE 1 is a top plan view portraying a yarder constructed to embody preferred teachings of the present invention.

Referring to said drawings, the yarder provides the usual plurality of spooling drums, namely a main drum, a haul-back drum, and a straw drum, designated by the numerals 10, 11 and 12, respectively. A clutch and a brake, hereinafter to be described, is provided for each of these drums, and giving support to the drums, clutches and brakes is a foundation. The foundation is here shown as being immobile but can, if desired, be supported either by wheeled or crawler-type trucks, powered or non-powered. If mobile it is usual to equip the yarder with hand or power-operated outrigger feet to provide stabilizing ground anchors.

The foundation comprises two beds, hereinafter termed platforms, each fabricated from longitudinal beams extending along the two sides and transverse beams extending across the two ends. The beams are sectionally of a channel configuration and are denoted by 9. One of the two platforms supports the spooling drums for the yarder, is designated generally by 13, and with the drums will be hereinafter termed the drum unit. The other platform 14 supports the prime mover 15 for the yarder and together with such prime mover will be hereinafter termed the power unit. The power unit lies co-planar with the drive unit at an end of the drum unit. Bolts 19 and the usual pilot pins (FIG. 9) permit the power unit to be disconnected from the drum unit either for shop servicing of the power plant 15 or application of the latter for other power purposes during periods when the yarder is not in use.

The haul-back drum is mounted upon a live horizontal input shaft 21 extending transversely of the platform 13 at the inner end thereof, and namely at the end proximal to the platform 14. The ends of the input shaft project beyond the drum. A transfer gear 22 and a sprocket wheel 23, with the latter outermost, are keyed in axially spaced relation upon one of the exposed ends of the shaft. A clutch designated generally by 25, and hereinafter to be described, has its hub keyed to the other exposed end of the shaft. Supporting the shaft are bearings 26 and 27. Bearing 26 occupies the spaced between the sprocket wheel and the transfer gear, and bearing 27 lies to the outside of the clutch. Power from the prime mover 15 which, as above stated, is supported by the platform 14, is passed through a torque converter 31 and drives the sprocket wheel 23 at reduced speed by a chain 32.

For the mounting of the main spooling drum 16 and the straw drum 18 a second horizontal shaft 33 is supported by bearings 34 and 35 to extend transversely of the platform 13 at the outer end thereof. The main drum is keyed to shaft 33 to occupy a position spaced longitudinally of the platform from the haul-back drum and in substantial alignment therewith. As with the input shaft 21, both ends of the shaft 33 have substantial exposure. The end exposed at the side of the platform occupied by the drive chain has the straw drum 18 journaled by bearings 36 thereon. A counterpart 37 of the transfer gear 22, albeit of larger diameter, is keyed to the shaft's other end.

A horizontal transfer shaft 40 extends transversely of the platform 13 at a point intermediate the two shafts 21 and 33, taking its support from bearings 41 and 42. The three bearings 26-34-41 which give support to one of the ends of the three shafts are aligned longitudinally in a common horizontal plane, as are the three bearings 27-35-42 which support the other ends of the shafts. Each is a thrust and journal roller bearing having the outer race gripped between boltably interconnected cap and base components 47 and 48, respectively, of a split block. Other than for differences in diameter and a mounting distinction which will be hereinafter pointed out the bearings are substantially identical. The base components 48 of the bearing blocks rest upon the longitudinal beams 9 of the platform 13, fitting in semi-cylindrical cut-outs which interrupt the otherwise rectilineal top profile of the beams. Weld seams join such base components to the beams.

The transfer shaft 40 has a functioning complement 44 of the transfer gear 22 keyed thereto, and at each of its two ends carries a respective one of two clutches 45 and 46, the former being functional to the main spooling drum and the latter being functional to the straw drum. Hubs 49 keyed to the transfer shaft serve as the driving elements for the clutches. The driven elements, denoted by 50 and 51, are journaled for rotation upon the transfer shaft. For the main drum a transfer pinion 52 in mesh with the transfer gear 37 is splined upon the driven element 50. For the straw drum a chain 53 is trained over sprocket wheels 54 and 55, one bolted to the driven element 51 and the other to a hub prolongation of the straw drum.

Guards, as 56, 57, 58, and 59, cover the chain 53 and the three clutches 25, 45 and 46.

Oil-tight casings, as 60 and 61, house the transfer gears 22–44 and 37–52. Each of these gear casings are split horizontally on a level coinciding with the plane occupied by the rotary axes of the three shafts 21, 33 and 40. For the base section 68 of each of the two gear casings, a bottom wall, an inner side wall, and two end walls are joined by weld seams to the web of a related longitudinal beam 9 so as to become integral with the platform and employ such web for its outer side wall. The cap components 47 of the concerned bearing blocks fit in cut-outs provided along the lower edge of the outer walls of the cap section of the gear casings, being joined thereto by weld seams in the same manner as the base components 48. The inner walls of each of the two sections of the split gear casings are similarly cut out along meeting edges and have shaft-saddles 69 fitted therein and joined to the concerned section by a weld seam. Said meeting edges of the two sections of the gear casings 61 are flanged to receive securing bolts. As will be seen from an inspection of FIG. 5 the bearing blocks 47–48 and the shaft-saddles 69 are fitted with oil seals.

The preferred clutch (see FIG. 5) has a set of driving plates 62 alternating with a floating plate or plates 63. The set of plates is received between a stationary back plate 64 rigid with the clutch hub and a movable front plate 65, and for the operation of the clutch applies compressed air from a source of pressure supply upon a diaphragm 66 against the resistant force of springs 67. The floating plate 63 and the front plate 65 are splined to the clutch hub. The driving plates are splined to the driven element of the clutch. In the instance of the clutch 25, the driven element is bolted directly to the haul-back drum. It should perhaps be here noted that a quick-release valve dumping pressure air directly to atmosphere and opened by spring pressure is embodied in each clutch. Upon placing a related remote 3-way control valve in its "off" position, the resulting zero pressure condition which obtains in the air supply line which leads to the clutch causes said spring for the release valve to exert its opening pressure, whereupon springs 67 assert their spring load to back off the plates 63 and 65.

Figure 8:
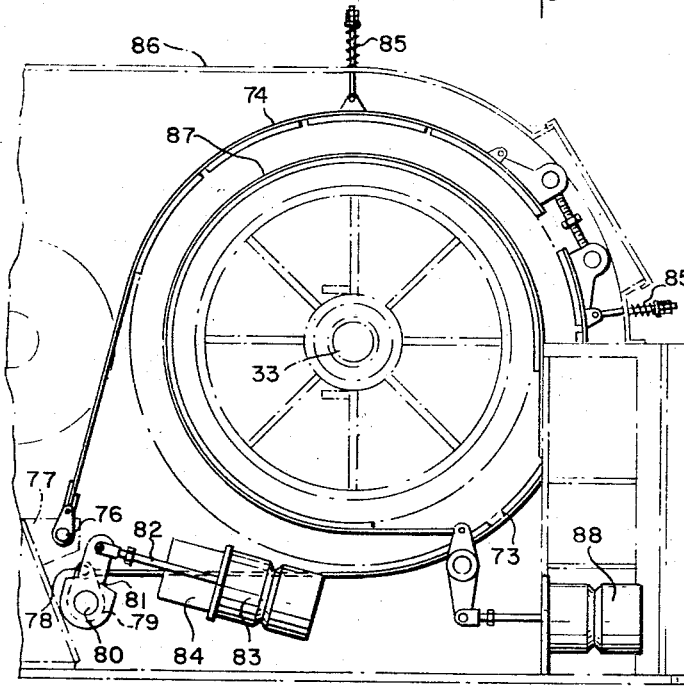

The main spooling drum 10 has a respective split brake drum 70 bolted to each of its two end flanges. The haul-back drum 11 likewise has a respective split brake drum 71 bolted to each of its two end flanges. The straw drum has a single brake drum 72 welded to an end flange thereof. Respective external brake bands (see FIG. 8) for the brake drums of the main and haul-back spooling drums are comprised of two lined sections 73–74 joined by an adjusting turn-buckle 75 at the inner ends. The outer end of one band section is anchored at 76 to a bracket 77 surmounting the platform. The outer end of the other band section is pivoted at 78 to the free end of a furcate lever arm 89. This lever arm is rooted to a fulcrum shaft 80 which extends laterally beyond a side edge of the particular gear case which lies at the related side of the platform. A lever arm 81 is carried by the projecting end of the fulcrum shaft and is linked by a connecting rod 82 to an air bellows 83 mounted from a side wall of the gear case by a bracket 84. The two lever arms 89 and 81 together with the fulcrum shaft 80 produce a substantial bell-crank. Springs 85 take a purchase from a brake guard 86 to normally hold the band sections in a released condition. The brake for the straw drum has a single band section 87 which is mounted somewhat differently in compensation of the outboard location of the drum but similarly employs an air bellows 88 to apply the braking action.

It should be here pointed out that the clutches for the main drum and for the haul-back drum, other than for their driven elements, are interchangeable. The brake drums and the brake bands are likewise interchangeable as between the main drum and the haul-back drum. The advantage in point of reduced inventory requirements will be apparent.

The control system for the spooling drums of the yarder is thought to be apparent from an inspection of the air circuitry shown in FIG. 11, with each of the foot-controlled air lines to the brake-setting bellows including a quick-release valve dumping to atmosphere in the same manner which was described for the clutches. While not included in the diagrammed circuit the speed range of the torque converter 31 is regulated by pressure air, and a control valve therefor also connects with the indicated manifold. A single lever controls the two clutches for the main and haul-back drums, insuring that one is disengaged while the other is engaged.

It is self-evident that the invention comprehends a passing of the input drive from the power plant to the shaft 40 rather than to the shaft 21, so that the shaft 40 becomes the input shaft. Should the shaft 40 become the input shaft, and it is desired to give to the spooling drums a direction of rotation the same as that which we have here shown, the power plant need only be turned end for end.

Figure 2:
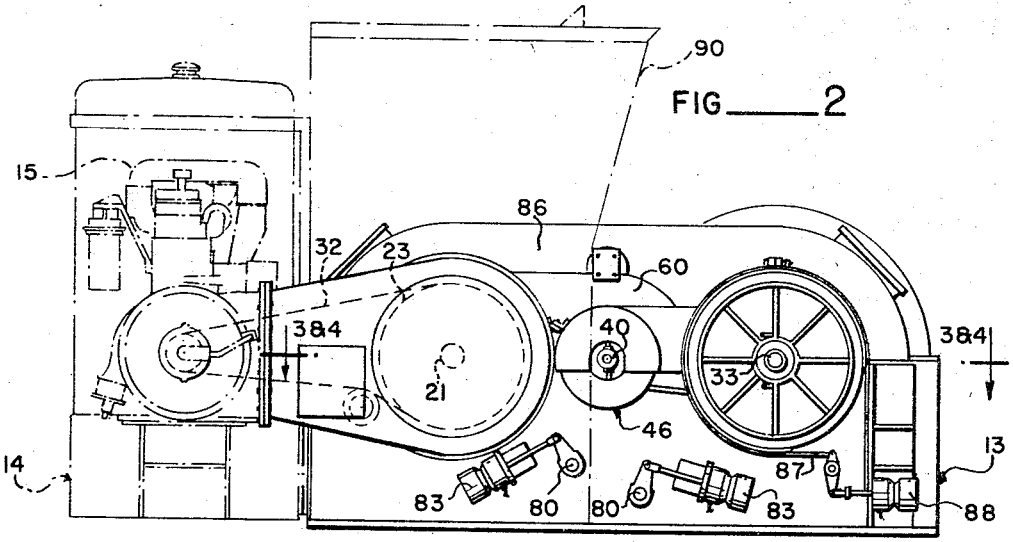
FIG. 2 is a side elevation thereof with the power plant and its mounting bed shown in phantom.
Figure 7:
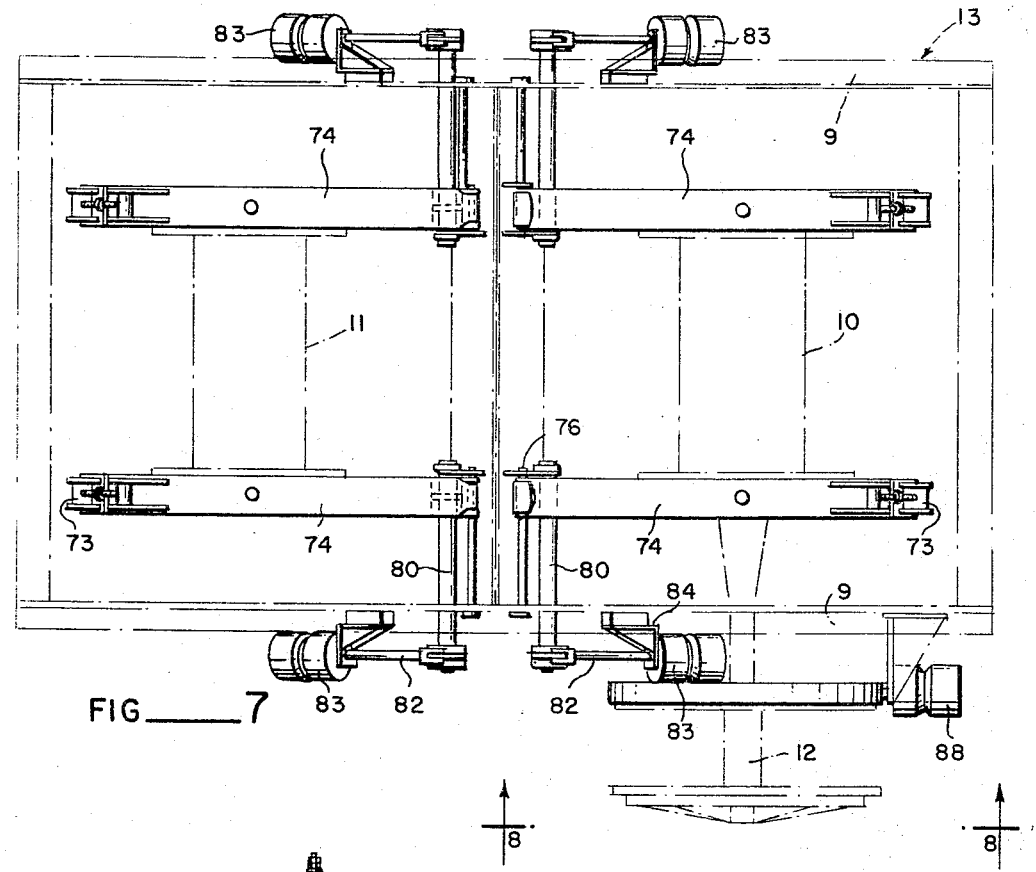
FIGS. 7 and 8 are somewhat schematic illustrations, the former a top plan and the latter a side view, of the brake lay-out for the yarder's several spooling drums.

It is purposed that the platform 14 be mounted either as shown in FIGS. 1 and 2, or as shown in FIG. 10, the former placing the power plant transverse to the drum unit and the latter longitudinal thereto. An operator's stand, designated by 90, is supported by the drum unit and may be located either above or to one side thereof.

It is thought that the yarder and the manner of operation thereof will have been clearly understood from the foregoing detailed description of our now-preferred illustrated embodiment. Changes in the details of construction may be resorted to without departing from the spirit of the invention and it is accordingly our intention that no limitations be implied and that the hereto annexed claims be given the broadest interpretation to which the employed language fairly admits.

What we claim is:

1. In a yarder, a platform, three shafts comprised of a #1 drum shaft, a #2 drum shaft, and a transfer shaft journal-mounted upon the platform for rotation about paralleling transverse horizontal axes and spaced at intervals longitudinally of the platform with the transfer shaft lying between the two drum shafts, a power plant for the yarder, a driving connection from the power plant to the #2 drum shaft, a spooling drum journaled for rotation upon said #2 drum shaft, a pair of spooling drums carried by the #1 drum shaft for rotation independently of one another, a normally disengaged clutch between the #2 drum shaft and the drum which is journaled thereon, a transfer connection passing power from the #2 drum shaft to the transfer shaft, separate transfer connections, each including a respective normally disengaged clutch carried by the transfer shaft, passing power from the transfer shaft one to one and the other to the other of the two drums which are carried by the #1 drum shaft, and control means for the several clutches located at a point remote to the spooling drums.

2. A yarder according to claim 1 in which the clutches for the connections which pass power from the transfer shaft to the two drums carried by the #1 drum shaft each is carried by the transfer shaft with its driving element fixed thereto.

3. A yarder according to claim 1, one of the drums carried by the #1 drum shaft being aligned longitudinally of the platform with the drum which is journaled upon the #2 drum shaft, the transfer connection which passes power from the transfer shaft to the one of said aligned drums which is carried by the #1 drum shaft comprising a set of meshed gears occupying a vertical plane normal to the shafts and spaced beyond one end of the aligned drums, the transfer connection which passes power to the transfer shaft from the #2 drum shaft comprising a set of meshed gears occupying a vertical plane normal to the shafts and spaced beyond the other end of the aligned drums, each of said sets of meshed gears being housed in a respective oil-tight gear casing.

4. A yarder according to claim 3 having brake drums for said aligned spooling drums removably bolted to the spooling drums at opposite ends thereof in spaces provided between said drums and the gear casings, and braking bands for the brake drums controlled from a point remote to the spooling drums, the brake drums and the bands being interchangeable as between said two aligned spooling drums.

5. A yarder according to claim 3 in which the gear casings are split horizontally to produce base and cap sections of which the base sections rigidly surmount the platform and have the cap sections boltably secured thereto, and wherein split blocks comprised of base and cap components provide the journal mountings for the shafts, said split blocks having the base component thereof integral with the base section and the cap component thereof integral with the cap section of the related split casing.

6. A yarder according to claim 3 characterized in that the casings and the platform are fabricated structures and wherein walls of the casings are comprised in part of component parts of the platform.

7. A yarder according to claim 3, the platform providing a respective beam extending longitudinally along each of the two sides, the gear casings being split horizontally to produce base and cap sections and having the base sections joined by a weld seam to the beams with the latter serving as a side wall therefor, and wherein split blocks comprised of base and cap components provide the journal mountings for the shafts, said split blocks having the base components thereof integral with the beam and the cap components thereof integral with the cap section of the related split casing.

8. A yarder according to claim 1 having a second platform on which the power plant is mounted and secured by bolts to the platform on which the drums are mounted, thus permitting the power plant and its platform to be detached bodily from the drum platform.

9. The yarder of claim 8 in which the platform for the power plant occupies a position at an end of the drum platform and admits of being selectively placed so that the power plant lies either endwise to the drum platform or at right angles thereto.

10. In a yarder, a platform, three shafts comprised of a #1 drum shaft, a #2 drum shaft, and a transfer shaft journal-mounted upon the platform for rotation about paralleling transverse horizontal axes and spaced at intervals longitudinally of the platform with the transfer shaft lying between the two drum shafts, a power plant for the yarder, a driving connection from the power plant to one of the two last named of said three shafts, a haul-driven element of the clutch carried by the #2 drum shaft, a main drum fixed to the #1 drum shaft in a position aligned longitudinally of the platform with the haul-back drum, a respective clutch one carried by the #2 drum shaft and one by the transfer shaft at one side of the drums and each having its driving element fixed to and its driven element journaled on the concerned shaft, a direct connection between the haul-back drum and the driven element of thec lutch carried by the #2 drum shaft, a set of meshed transfer gears located at the side of the drums opposite that occupied by the clutches and including one gear fixed to the #2 drum shaft and another gear fixed to the transfer shaft, a set of meshed transfer gears located at the side of the drums occupied by the clutches and including one gear fixed to the driven element of the clutch which is carried by the transfer shaft and another gear fixed to the #1 drum shaft, respective brakes for each of said drums, and means located remote to the drums for controlling the brakes and controlling the clutches.

11. The yarder of claim 10 in which the driving connection from the power plant to the concerned one of said two last-named of the three shafts comprises a chain passing about a sprocket wheel fixed to said concerned shaft upon an end thereof located laterally beyond the transfer gear which is fixed to said shaft.

12. A yarder according to claim 11 having a straw drum journaled upon the #1 drum shaft at the same side of the platform as that occupied by the input drive from the power plant, and means for transferring power to the straw drum from the transfer shaft, said last-named means comprising: a remote-control clutch carried by the transfer shaft in a position spaced laterally beyond the related one of the two first-named meshed transfer gears, the straw-drum clutch having its driving element fixed to and its driven element journaled on said transfer shaft, and a chain drive from the driven element of the straw-drum clutch to the straw drum.

13. A yarder according to claim 11 in which the rotary axes of the three shafts occupy a common horizontal plane.

14. A yarder according to claim 10 in which each of said sets of meshed transfer gears is spaced axially of the shafts beyond a related end of the drums and is housed in an oil-tight gear casing.

15. A yarder according to claim 10 in which the clutches for the main and haul-back drums are interchangeable and controlled by compressed air from a point remote to the drums.

16. A yarder according to claim 15 having brake drums for said spooling drums removably bolted to end flanges of the spooling drums at each of the opposite ends thereof, and braking bands for the brake drums controlled by compressed air from a point remote to the spooling drums, the brake drums and the bands therefor being interchangeable as between the drums.

17. A yarder according to claim 10 in which each of said sets of meshed transfer gears is spaced axially of the shafts beyond a related end of the drums and is housed in an oil-tight gear casing, the gear casings being split horizontally to provide a base component and a cap component with the cap component being removably bolted to the base component, base and cap components of split blocks being employed as the journal moutings for the shafts, the base component of said split blocks being welded to the base component of a related one of said gear casings, the cap component of the split blocks being welded to the cap component of a related one of the split gear casings.

18. A yarder according to claim 17 characterized in that the casings and the platform are fabricated structures and wherein walls of the casings are comprised in part of component parts of the platform.

19. In a yarder, a platform, three shafts journal-mounted from the platform for rotation about paralleling transverse axes spaced at intervals longitudinally of the platform in a common horizontal plane with the two end shafts serving as drum shafts and the intervening shaft as a transfer shaft, spooling drums carried by the drum shafts in positions aligned longitudinally of the platform, a respective set of meshed transfer gears located at each of the two sides of the drums in positions spaced laterally therefrom and acting one set to pass drive between the transfer shaft and one drum shaft and the other set to pass drive between the transfer shaft and the other drum shaft, a respective oil-tight gear casing housing each of said sets of transfer gears, said gear casings being split horizontally to provide a base component and a cap component with the cap component being removably bolted to the base component, base and cap components of split blocks being employed as the journal mountings for the shafts, the base component of said split blocks being welded to the base component of a related one of said gear casings, the cap component of the split blocks being welded to the cap component of a related one of the split gear casings.

20. A yarder according to claim 19 characterized in that the casings and the platform are fabricated structures and wherein walls of the casings are comprised in part of component parts of the platform.

21. In a yarder, a platform, three shafts comprised of a #1 drum shaft, a #2 drum shaft, and a transfer shaft jornaled-mounted upon the platform for rotation about paralleling transverse horizontal axes and spaced at intervals longitudinally of the platform with the transfer shaft lying between the two drum shafts, a transfer connection interconnecting the two last-named of said three shafts, a power plant for the yarder, a driving connection from the power plant to one of said two shafts which are connected by said transfer connection, a spooling drum journaled for rotation upon said #2 drum shaft, a spooling drum carried for rotation by the #1 drum shaft, a normally disengaged clutch between the #2 drum shaft and the drum which is journaled thereon, a transfer connection including a normally disengaged clutch carried by the transfer shaft for drive-coupling the transfer shaft to the drum which is carried by the #1 drum shaft, and control means for the several clutches located at a point remote to the spooling drums.

22. A yarder according to claim 21 in which the #1 shaft also has another drum journaled thereon, and a transfer connection for drive-coupling the transfer shaft to said last-named drum and including a clutch carried by the transfer shaft.

23. A yarder according to claim 21 in which the transfer connection to the drum which is carried by the #1 drum shaft is a reduction transfer.

References Cited
UNITED STATES PATENTS

| | | | |
|---|---|---|---|
| 1,774,389 | 8/1930 | McGiffert | 254—185 |
| 2,775,429 | 12/1956 | Ashton. | |
| 3,235,229 | 2/1966 | Buschbom | 254—186 |
| 3,244,404 | 4/1966 | Bender | 254—185 |

H. C. HORNSBY, *Assistant Examiner.*

EVON C. BLUNK, *Primary Examiner.*